United States Patent
Toby et al.

(10) Patent No.: US 10,491,342 B1
(45) Date of Patent: Nov. 26, 2019

(54) BIT ERROR RATIO TESTS WITH TWO-SIDED BIT ERROR RATIO FREQUENTIST INTERVALS

(71) Applicant: HEWLETT PACKARD ENTERPRISE DEVELOPMENT LP, Houston, TX (US)

(72) Inventors: Benjamin Toby, Fort Collins, CO (US); David P. Kopp, Fort Collins, CO (US); Karl J Bois, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/042,276

(22) Filed: Jul. 23, 2018

(51) Int. Cl.
*H04J 11/00* (2006.01)
*H04L 1/20* (2006.01)

(52) U.S. Cl.
CPC .......... *H04L 1/203* (2013.01); *H04J 11/0056* (2013.01)

(58) Field of Classification Search
USPC ................................................. 375/345, 319
See application file for complete search history.

(56) References Cited

U.S. PATENT DOCUMENTS

| | | | |
|---|---|---|---|
| 4,291,410 A * | 9/1981 | Caples .................. | H04B 7/005 329/300 |
| 5,949,832 A | 9/1999 | Liebetreu et al. | |
| 6,735,724 B1 | 5/2004 | McClellan | |
| 7,389,450 B2 | 6/2008 | Fleischer-Reumann | |
| 7,426,664 B2 | 9/2008 | Maucksch | |
| 7,895,480 B2 | 2/2011 | Maucksch | |
| 7,899,638 B2 | 3/2011 | Miller | |
| 8,601,356 B2 | 12/2013 | Langenbach et al. | |
| 9,264,187 B1 | 2/2016 | Sosa | |
| 9,712,263 B1 | 7/2017 | Bois et al. | |
| 2009/0262870 A1 | 10/2009 | Ashbrook et al. | |

(Continued)

FOREIGN PATENT DOCUMENTS

CN 101435329 5/2012

OTHER PUBLICATIONS

Justin Redd, Lightwave, Calculating Statistical Confidence Levels for Error-Probability Estimates, Apr. 1, 2000, 9 Pgs.

(Continued)

*Primary Examiner* — Eva Y Puente
(74) *Attorney, Agent, or Firm* — Hewlett Packard Enterprise Patent Department

(57) ABSTRACT

An example communications device may include a slicer that may generate a digital output signal by thresholding a received signal according to variably set timing and voltage parameters. Testing circuitry may determine expected bit error ratios for multiple time-voltage slicer by performing test operations corresponding respectively to the multiple time-voltage slices. Each of the test operations may include setting the timing and voltage parameters of the slicer based on the corresponding time-voltage slice, periodically measuring a number of total bits and a number of erroneous bits based on the digital output signal and calculating a two-sided bit error ratio frequentist confidence interval (FCI) size from the measured bit error ratio. The measured bit error ratio is output in response to the two-sided bit error ratio FCI being less than or equal to a two-sided bit error ratio interval target size.

20 Claims, 5 Drawing Sheets

(56) References Cited

U.S. PATENT DOCUMENTS

| | | | |
|---|---|---|---|
| 2010/0246722 A1* | 9/2010 | Campeau | H04L 25/063 |
| | | | 375/319 |
| 2016/0050030 A1* | 2/2016 | Riedl | H04B 11/00 |
| | | | 367/133 |
| 2017/0090811 A1* | 3/2017 | Tzannes | H04L 1/0041 |
| 2017/0359119 A1* | 12/2017 | Li | H04B 10/6931 |

OTHER PUBLICATIONS

Marcus Müller, "Total Jitter Measurement at Low Probability Levels, Using Optimized Bert Scan Method," Feb. 12, 2007, 18 pages, <http://literature.cdn.keysight.com/litweb/pdf/5989-2933EN.pdf>.

Unknown, Maxim Integrated, HFTA-010.0: Physical Layer Performance: Testing the Bit Error Ratio (BER), Technical Article HFTA-010.0 (Rev.0, Oct. 2004), 7 Pgs.

* cited by examiner

BIT ERROR RATIO TESTS WITH TWO-SIDED BIT ERROR RATIO FREQUENTIST INTERVALS

BACKGROUND

A communication device may detect bits of a received signal by comparing the received signal to a threshold voltage at sample timings. The combination of sample timing and threshold voltage that is used in detecting the bits may be referred to as a time/voltage slice, and the device that does the detecting may be referred to as a slicer. The accuracy of the slicer in resolving bits in the received signal may depend on the time/voltage slice that the slicer is set to use. A margining operation may be used to, among other things, to help determine which time/voltage slice is the best for the slicer to use during communications. The margining operation may include performing a bit error ratio (BER) test for multiple time/voltage slices, which may determine a BER estimate for each of the tested time/voltage slices. The BER estimates may then be used to, among other things, identify a time/voltage slice for the slicer to use during communications.

BRIEF DESCRIPTION OF THE DRAWINGS

Certain examples are described in the following detailed description and in reference to the drawings, in which.

DETAILED DESCRIPTION OF SPECIFIC EXAMPLES

Some time/voltage slices that a slicer might use are more likely to result in errors than other time/voltage slices. In general, time/voltage slices that are in regions in a time-voltage graph that are likely to be traced by the signal tend to result in errors more frequently than time/voltage slices that are further from these regions. However, it may not be known in advance which time/voltage slices are going to be in low-error regions. Thus, the margining operation may be performed in order to identify high error time/voltage slices and low error time/voltage slices.

Figure 1:
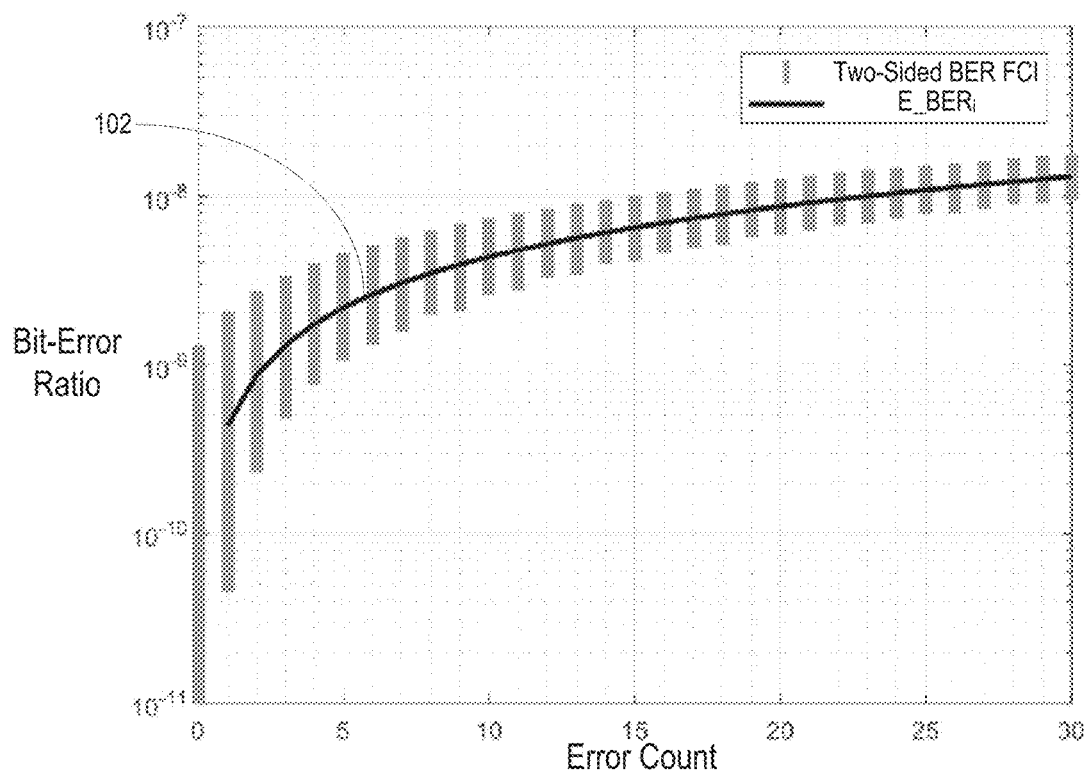
FIG. 1 is a data plot illustrating an example two-sided bit error ratio frequentist confidence interval for an estimated bit-error ratio.

The margining operation may include determining estimated BERs for multiple time/voltage slices. The estimated BER for a given time/voltage slice may be an estimate of the true (statistically expected) bit error ratio for that time/voltage slice. The estimated BERs for the time/voltage slices may be determined by performing a BER test for each of the time/voltage slices in question. FIG. 1 is a data plot illustrating an estimated BER 102 for a particular time/voltage slice. Once estimated BERs have been determined for a number of time/voltage slices, different regions that correspond to different BERs may be identified.

The performance of the BER test for a given time/voltage slice may include having the slicer detect bits of a test signal at the given time/voltage slice. The detected bits may be compared to trusted bits to detect if there have been any errors. Errors and bits may be counted as the test proceeds, and when the test is ended a value that is equal to the number of errors actually detected during the test divided by the total number of bits received during the test may be used as the estimated BER for the given time/voltage slice.

In particular, the true (statistically expected) BER for an i-th time/voltage slice ($S_i$) may be represented herein as $E\_BER_i$, the estimated BER that is used in the margining operation as an estimate of $E\_BER_i$ may be represented herein as $BER_i$, and a measured bit error ratio may be represented herein as $\overline{BER}_i$. The value of $\overline{BER}_i$ may be updated each time that the bit error ratio is measured, with a value of $\overline{BER}_i$ upon a measurement being equal to $E_i/N_i$, where $E_i$ is the number of errors detected thus far during the test for $S_i$, as illustrated on the x-axis of FIGS. 1 and 2, and $N_i$ is the total number of bits received thus far during the test for $S_i$. In certain examples, the estimated $BER_i$ that is used in the margining operation for $S_i$ may be set equal to the current value of $\overline{BER}_i$ at the time when the test for $S_i$ is ended.

When the estimated $BER_i$ is determined based on the measured $\overline{BER}_i$, the accuracy of the estimated $BER_i$ may depend on how large $N_i$ and/or how large $E_i$ are ("accuracy" in this context refers to how good of an estimate $BER_i$ is for the true $E\_BER_i$, where the true $E\_BER_i$ is the bit error rate as the measured number of bits $N_i$ approaches infinity). In particular, as $N_i$ gets larger, $E\_BER_i$ approaches $\overline{BER}_i$. More precisely, as $N_i$ gets larger $E\_BER_i$ is more and more likely to be found within some range that is associated with $\overline{BER}_i$.

Thus, in order to increase the accuracy of each estimated $BER_i$, in some approaches a large number of bits $N_i$ may be used in each BER test. For example, in some approaches a parameter X may be set in advance to some large value, and, for each time/voltage slice, the BER test operation is continued until $N_i$ reaches the value of X, at which point the test for the current time/voltage slice may be ended and the next test begun. In other words, in these approaches $N_i = X$ may be used as a necessary and sufficient exit criterion for the BER tests. These approaches may be referred to hereinafter as the "minimum-N approaches". In the minimum-N approaches, the parameter X is often set to a large value (e.g. $10^{12}$) to reach a sufficiently accurate estimate of $BER_i$. The parameter X may be set based on a desired minimum observable $\overline{BER}_i$ at a desired level of confidence.

Thus, a potential difficulty associated with the margining operation is that it might take a long time to complete, or may not complete at all. In some implementations; the duration of the margining operation may be proportional to the average number of bits that are used per test. If the number of bits per test is relatively large, the duration of the margining operation may be relatively long. In the minimum-N approaches, the average number of bits per test is equal to X, which usually is a relatively large value; thus, in the minimum-N approaches the duration of the margining operation may be relatively long.

Figure 2:
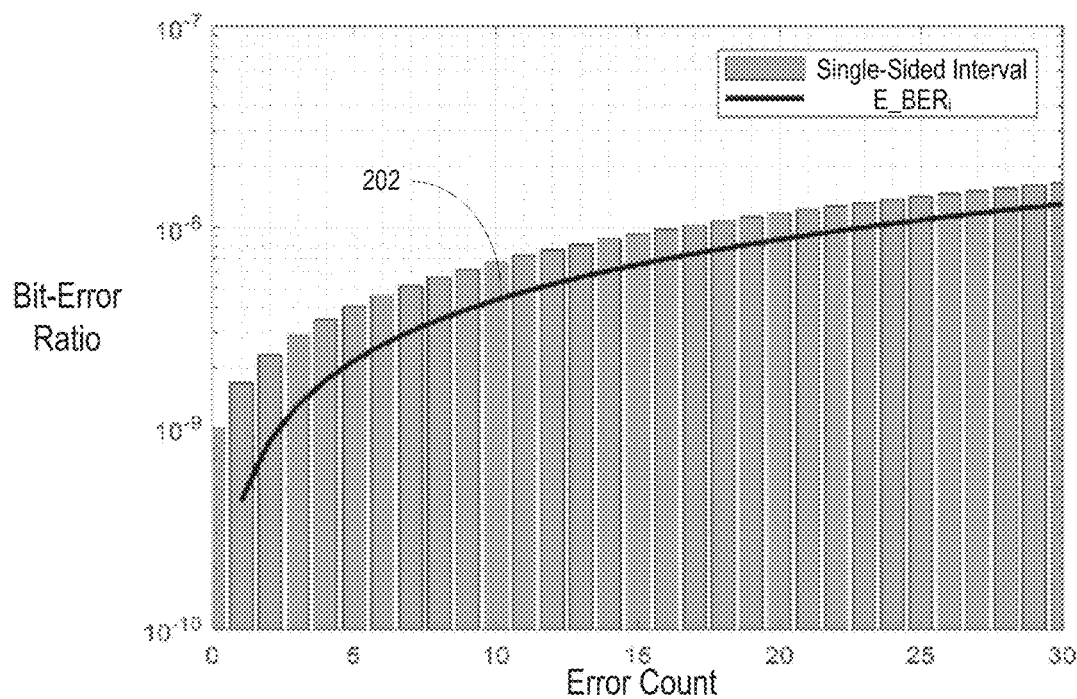
FIG. 2 is a data plot illustrating an example single-sided interval for an estimated bit-error ratio.

To accelerate the length of testing, alternative exit criteria may be utilized. For example, testing may be halted, and a report that the channel has failed may be generated, where $BER_i$ is greater than a maximum allowable bit error rate $BER_{FAIL}$ to a threshold confidence level. As another example, testing may be halted, and a report that the channel has passed may be generated where $BER_i$ is less than a minimum required bit error rate $BER_{PASS}$ to a threshold confidence level. In this approach, testing may occur until a threshold confidence level is reached. However, this test may result in relatively long tests, and in some cases, may result in infinitely long tests. Similarly, upper level limits, e.g., testing at least y bits with the detection of no more than x errors, or lower level limits, e.g., detecting at least x errors in no more than y tested bits, may result in non-convergence. FIG. 2 is a data plot illustrating an estimated BER 202 for a particular time/voltage slice. As illustrated in FIG. 2, a single-sided interval for a particular $E\_BER_i$ may not converge. Thus, utilizing a single-sided interval as an exit criterion may result in the exit criterion never being satisfied.

As illustrated in FIG. 1, a two-sided bit error ratio frequentist confidence interval (FCI) may be utilized to ensure convergence at a particular confidence level. Specifically, a particular time-voltage slice may be tested until a calculated two-sided bit error ratio FCI is less than a threshold two-sided bit error ratio FCI. The two-sided bit error ratio FCI is an interval having an X % chance of holding $BER_i$, where X represents the confidence level. The threshold two-sided bit error ratio FCI is determined from multiple threshold components, a threshold size for a two-sided bit error ratio, and a confidence level X. Testing of a particular time-voltage slice may end when the threshold size is met at the target confidence level. Accordingly, the threshold two-sided bit error ratio FCI, compared to the calculated two-sided bit error ratio FCI, may be utilized as an exit criterion.

Figure 3:
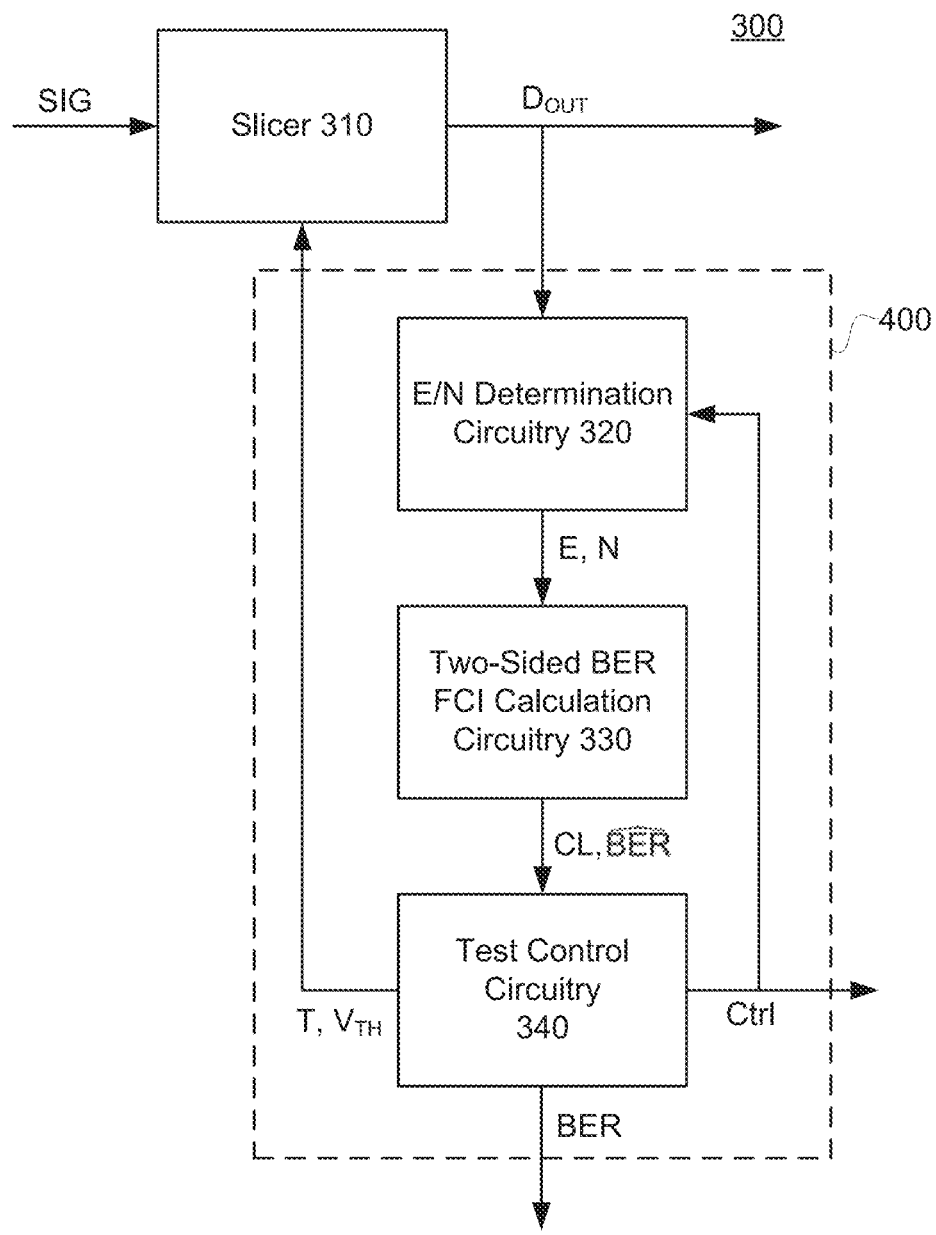
FIG. 3 is a block diagram illustrating an example system including a slicer and testing circuitry.

FIG. 3 is a flowchart illustrating an example system 300. The example system 300 may include a slicer 310 and testing circuitry 400. The testing circuitry 400 may include E/N determination circuitry 320, two-sided BER FCI calculation circuitry 330, and test control circuitry 340. The testing circuitry 400 may control performance of a margining operation, including controlling BER test operations.

In certain examples, slicer 310 and testing circuitry 400 may both be part of the same communications device; in such examples, testing circuitry 400 may be referred to as "integrated" testing circuitry and the BER tests performed thereby may be referred to as integrated BER tests (IBERTs). In some example implementations, the slicer 310 and testing circuitry 400 may be formed as part of the same integrated circuit as one another. In certain other examples, slicer 310 and testing circuitry 400 may be part of separate devices that are communicably connected; for example, the slicer 310 may be part of a communications device and the testing circuitry 400 may be part of a testing device that is connected to the communications device to perform the BER tests.

In an example implementation, slicer 310 may threshold a received signal SIG according to variably set timing and voltage parameters (T, $V_{TH}$), and thereby generate a digital output signal $D_{OUT}$. When "threshold" is used herein as a verb, it means to compare a signal to a threshold voltage at sample timings and generate a digital output based on the result of the comparison. The sample timings at which slicer 310 thresholds the received signal SIG may be controlled with the timing parameter T. The threshold that slicer 310 compares the received signal SIG to may be controlled with the voltage parameter $V_{TH}$. Each distinct combination of settings for the timing and voltage parameters T and $V_{TH}$ is a distinct time/voltage slice.

Slicer 310 may have any known architecture. For example, slicer 310 may include a comparator that compares the received signal SIG (or a signal that is based thereon) to a threshold voltage, and outputs a first digital value if the received signal SIG is above the threshold voltage and a second digital value if the received signal SIG is below the threshold voltage. In such an example, the timing parameter T may control a phase of a clock signal CLK that controls sample timings of the comparator and the voltage parameter $V_{TH}$ may control the threshold voltage of the comparator. In certain examples, slicer 310 may further include, for example, a sample-and-hold circuit that samples the received signal SIG and outputs the sampled value to the comparator, an amplifier that amplifies the received signal SIG, additional comparators, demux stages, decoders, registers, and so on. For simplicity, the example illustrated in FIG. 3 shows a single slicer 310, but it should be understood that system 300 could include any number of slicers. In certain examples, the received signal SIG may have two distinct signal levels (such as a non-return to zero (NRZ) signal), in which case a single slicer 310 may be sufficient to threshold the received signal. In certain other examples, the received signal SIG may have more than two distinct signal levels (such as a four level pulse amplitude modulation (PAM-4) signal), in which case system 300 may include multiple instances of slicer 310 to threshold the received signal SIG. For example, when the received signal SIG is a PAM-4 signal, system 300 may include three slicers 310 for data detection, which each threshold the received signal SIG at different threshold voltages (additional slicers for edge detection may also be included); in such a case, the voltage parameter $V_{TH}$ may be a multi-valued parameter that includes distinct voltage settings for each of the slicers.

As noted above, in certain examples the timing parameter T may control a phase of a clock signal CLK, and sample timings may correspond to specific portions of a waveform of CLK, such as rising edges, falling edges, both rising and falling edges, etc. The clock signal CLK may be such that its frequency $f_{CLK}$ corresponds to a frequency $f_{DATA}$ by, for example, exploiting fore-knowledge of $f_{DATA}$, employing a clock-and-data recovery (CDR) technique, and/or the like.

The testing circuitry 400 is described herein in terms of separate subcomponents merely for ease of description, and this should not be understood to imply that each of the components of the testing circuitry 400 is necessarily physically distinct from the others. Instead, some (or all) of the aforementioned components may share certain physical structures with some (or all) of the other components. Thus, operations that may be described herein as being performed by different ones of the aforementioned components may ultimately be performed by the same physical structure or collection of structures. In particular, the testing circuitry 400 may be implemented via logic circuits, processing circuitry, (such as central processing units (CPUs), microprocessors, microcontroller devices, digital signal processors (DSPs), etc.) executing machine readable instructions stored in non-transitory machine readable media, application-specific integrated circuits (ASICs), field-programmable gate arrays (FPGAs), application-specific instructions set processors (ASIPs), and/or the like, in any combination. Thus, each of the E/N determination circuitry 320, BER/confidence level determination circuitry 330, and test control circuitry 340 may be implemented by any combination of the aforementioned physical structures, some of which may be shared. More detailed examples of these subcomponents of the testing circuitry 400 will be described below.

Figure 4:
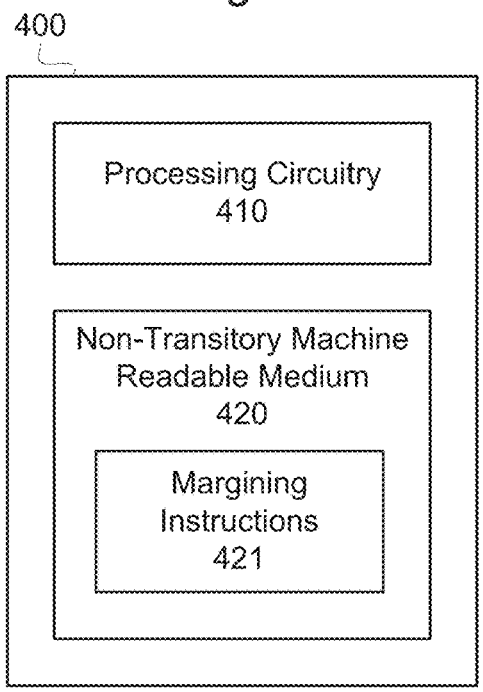
FIG. 4 is a block diagram illustrating example testing circuitry.

For example, FIG. 4 illustrates one example of the testing circuitry 400 that includes processing circuitry 410 and non-transitory machine readable medium 420, which stores machine readable instructions including margining instructions 421. The margining instructions 421 may include instructions that, when executed by the processing circuitry 410, cause the processing circuitry to perform some or all of the operations described herein as being performed by the testing circuitry 400. The non-transitory machine readable medium 420 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.).

As noted above, the testing circuitry 400 may include E/N determination circuitry 320, two-sided BER FCI calculation circuitry 330, and test control circuitry 340. The E/N determination circuitry 320 may detect errors in the signal $D_{OUT}$ that is output from the slicer 410, measure the number of errors that have been detected thus far during a current BER test ($E_i$), and measure the total number of bits received by the slicer 410 thus far during the current BER test ($N_i$). The two-sided BER FCI calculation circuitry 330 may periodically measure $\overline{BER}_i$ and periodically calculate the two-sided BER FCI for the current value of $\overline{BER}_i$ based on a given confidence level and the values $E_i$ and $N_i$ that are output by the E/N determination circuitry 320. The test control circuitry 340 may control the BER test operations, including controlling starting and stopping of a BER test for a time/voltage slice, setting values for the timing and voltage parameters T and $V_{TH}$, as well as determining whether the calculated two-sided BER FCI is less than a target size for a two-sided BER interval. When the calculated two-sided BER FCI is less than a two-sided BER interval target size, test control circuitry 340 may end the current BER test. Test control circuitry 340 may further output a current value of the measured $\overline{BER}_i$ to be used as an estimated BER for a margining operation.

E/N determination circuitry 320 may detect errors in $D_{OUT}$ by comparing bits of $D_{OUT}$ to corresponding bits from a trusted sequence of bits $D_{TRUST}$. For example, the trusted sequence of bits $D_{TRUST}$ may be identical to a known test sequence $SIG_{TEST}$, and during the BER test operation the known test sequence $SIG_{TEST}$ may be transmitted to the slicer 110 and received as the received signal SIG. Because the n-th bit of $D_{TRUST}$ is identical to the n-th bit of $SIG_{TEST}$, then the n-th bit of $D_{OUT}$ should be the same as the n-th bit of $D_{TRUST}$ if there has been no error in the transmission/reception of $SIG_{TEST}$. Thus, whenever a bit of $D_{OUT}$ differs from its corresponding bit in $D_{TRUST}$, an error is detected. A synchronization sequence may be included in both the test sequence $SIG_{TEST}$ and the trusted sequence of bits $D_{TRUST}$ in order to allow the signals to be synchronized before testing begins so that corresponding bits may be properly compared.

In certain examples, the test sequence $SIG_{TEST}$ may be generated by the test circuitry 400 and communicated to slicer 110. In other examples, the test sequence $SIG_{TEST}$ may be generated by a separate communication device that is connected to system 100, and may be communicated thereby to slicer 110. In examples in which a separate communication device is used, the testing circuitry 400 may communicate with the separate communication device to enable the separate communication device to know when a BER test is to begin and end, to identify which test sequence $SIG_{TEST}$ is to be used (if multiple test sequences are available for use), and so on.

In certain examples, the trusted sequence of bits $D_{TRUST}$ may be stored locally in the test circuitry 400 prior to the test operation, and may be recalled by the E/N determination circuitry 120 for comparison to $D_{OUT}$. In certain examples, the trusted sequence of bits $D_{TRUST}$ may be generated dynamically by the test circuitry 400 as the BER test proceeds, for example by applying an algorithm known to generate the correct sequence of bits. In certain examples, a single signal source may communicate the known test sequence $SIG_{TEST}$ to both the slicer 110 and the E/N determination circuitry 320, and the E/N determination circuitry 320 may treat this signal as the trusted sequence of bits $D_{TRUST}$; in such a case, a communication path over which the test sequence $SIG_{TEST}$ is communicated to the E/N determination circuitry 320 (such as an internal bus) may have sufficient quality that the accuracy of the signal received by the E/N determination circuitry 320 may be trusted.

Figure 5:
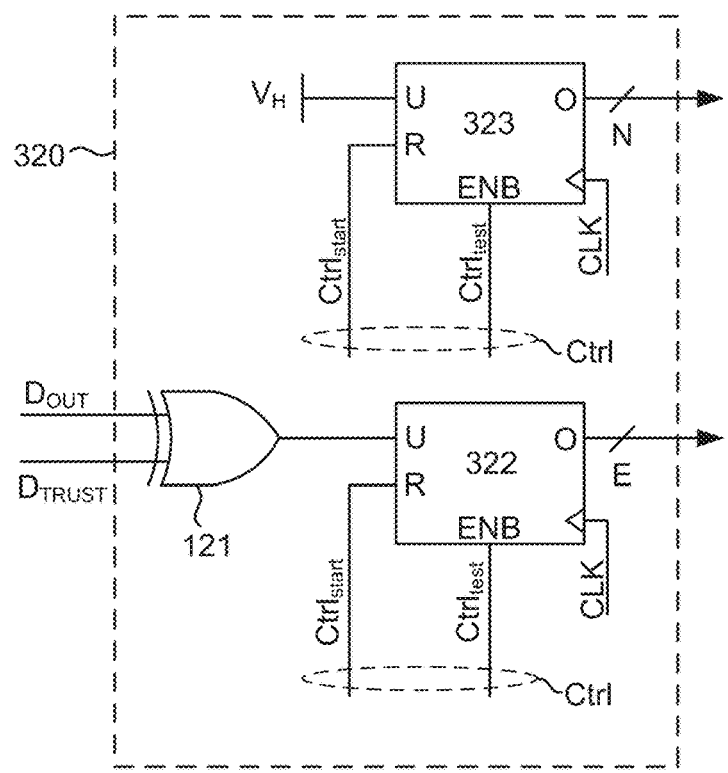
FIG. 5 is a block diagram illustrating example E/N determination circuitry implemented via logic circuits.

FIG. 5 illustrates one possible example of the E/N determination circuitry 320 implemented via logic circuits. The example E/N determination circuitry 320 of FIG. 5 includes XOR gate 121, counter 122, and counter 123. The XOR gate 121 receives $D_{OUT}$ and $D_{TRUST}$ as input signals, and outputs a signal according to the exclusive disjunction logical function. In other words, the XOR gate 121 detects errors in $D_{OUT}$, as it compares $D_{OUT}$ and $D_{TRUST}$ and outputs a high signal whenever they are different. The counter 122 receives the output of the XOR gate 121 at its up-count input U, a clock signal CLK at its clock input, and outputs an error count $E_i$. The counter 122 samples the output of the XOR gate each clock pulse and up-counts whenever an error is detected in $D_{OUT}$. The counter 123 receives a constant logical high voltage $V_H$ at its up-count input U, a clock signal CLK at its clock input, and outputs a total bit count $N_i$. Thus, the counter 123 up-counts each clock pulse (since $V_H$ is always high). Since $D_{OUT}$-includes one bit per clock pulse, the output $N_i$ corresponds to the number of bits in $D_{OUT}$ since a last time that the counter 123 was reset and began counting. Both the counters 122 and 123 may have a control signal $Ctrl_{start}$ input to their reset inputs R and a control signal $Ctrl_{test}$ input to their enable inputs ENB. The control signals $Ctrl_{start}$ and $Ctrl_{test}$ may be parts of the control signal Ctrl that is output by the test control circuitry 140. The control signal $Ctrl_{start}$ may pulse at the start of a BER test operation, thereby causing the counters 122 and 123 to be reset. The control signal $Ctrl_{test}$ may be high during performance of a BER test operation and low when the BER test operation has ceased, thereby enabling the counters to count during the test operation and disabling the counters from continuing to count when the test operation has ceased.

Two-sided BER FCI calculation circuitry 330 may periodically measure $\overline{BER}_i$ based on the current values of $E_i$ and $N_i$ output from the E/N determination circuitry 320, where $\overline{BER}_i$ is measured by calculating $$\overline{BER}_i = \frac{E_i}{N_i}.$$

The two-sided BER FCI calculation circuitry 330 may also periodically calculate a two-sided BER FCI for the current measured $\overline{BER}_i$. The two-sided BER FCI may be calculated from the calculated $\overline{BER}_i$ and a confidence level. The timings at which $\overline{BER}_i$ is measured and at which the two-sided BER FCI are determined do not necessarily need to be the same. In certain examples, $\overline{BER}_i$ may be measured every g bits and the two-sided BER FCI may be calculated every h bits, where g and h are integer values that are equal to or greater than 1 and that may be, but do not have to be, equal to each other.

In an example implementation, two-sided BER FCI calculation circuitry 330 may calculate the two-sided BER FCI for the current measured $\overline{BER}_i$ by fitting the measured bit error ratio to a distribution, e.g., a binomial probability distribution, with errors $E_i$ being the events of interest and the measured $\overline{BER}_i$ being used as the probability of an event. The two-sided confidence interval (CI) may, in some examples, be calculated by the equation $$CI = \alpha t \sqrt{\overline{BER}_i \left( \frac{1 - \overline{BER}_i}{N} \right)},$$

where N is the number of bits, alpha is a value that is dependent on, and may be proportional to, a confidence level, and t is dependent upon the value of N and may be derived from any number of distributions, including a Student's t-distribution derived from a binomial distribution. For example, t may refer to the critical value of the two-sided Student's t-distribution having a number of degrees of freedom equal to one less than the number of bits N. As N increases, $1 - \overline{BER}_i \approx 1$. Thus, for large N, the two-sided confidence interval may be approximated to be $$CI \approx \alpha t \sqrt{\frac{\overline{BER}_i}{N}}.$$

As used herein, the "confidence level" of a measured $\overline{BER}_i$ is any quantitative measure of the likelihood (i.e., probability) that the true (statistically expected) value $E\_BER_i$ is within the two-sided BER FCI. Thus, a higher confidence level for a given $\overline{BER}_i$ will result in a larger two-sided BER FCI. Similarly, a lower confidence level for a given $\overline{BER}_i$ will result in a smaller two-sided BER FCI. In an example implementation, the confidence level may be a variable input, and may be programmable, such that a confidence level for a statistically expected value $E\_BER_i$ may be set (e.g. by a user). In certain examples, the confidence level may be set by on-the-fly calculations (e.g. dependent on $E_i$ and/or $N_i$) using analytical or numeric solutions to specified mathematical formulas. In certain examples, the determination of the confidence level may be accomplished by referencing a lookup table for stored values of the confidence level that have been calculated in advance. Such referencing of a lookup table may be accomplished by processing circuitry executing machine-readable instructions, or by dedicated hardware.

As noted above, test control circuitry 340 may control starting and stopping of a BER test for a given time/voltage slice. At the start of a BER test for a given time/voltage slice, test control circuitry 340 may set the values of the timing and voltage parameters T and $V_{TH}$ of the slicer 310 based on the given time/voltage slice, cause a test signal $SIG_{TEST}$ to be sent to the slicer 310, and, once $D_{OUT}$ and $D_{TRUST}$ have been synchronized, cause the E/N determination circuitry 120 to start counting $E_i$ and $N_i$. At the end of the BER test for a given time/voltage slice, the test control circuitry 340 may cause the test signal $SIG_{TEST}$ to cease being sent to the slicer 310, may cause the E/N determination circuitry 320 to stop counting $E_i$ and $N_i$, and may output the current value of the measured $\overline{BER}_i$ as the estimated $BER_i$ that is to be used in the margining operation as an estimate of the true (or statistically expected) value $E\_BER_i$. Thereafter, a test operation for a next time/voltage slice may begin, and this process may be repeated for each time/voltage slice that is to be tested as part of a margining operation.

The test control circuitry 340 may determine when a current BER test is to be stopped by applying exit criteria. As described above, the examples disclosed herein may use a threshold two-sided bit error ratio FCI as compared to a calculated two-sided bit error ratio FCI as an exit criterion. Specifically, the test control circuitry may determine whether the calculated two-sided bit error ratio FCI is less than the threshold two-sided bit error ratio FCI. Other additional exit criteria may also be implemented, and test control circuitry 340 may determine whether these additional exit criterion (if any) are satisfied. If any independently sufficient exit criteria is satisfied (or if any group of collectively sufficient exit criteria are all satisfied), then test control circuitry 340 may cause the current BER test to end.

Once a BER test for an n-th time/voltage slice $S_n$ has been stopped, the test control circuitry 340 outputs the current value of the measured $\overline{BER}_n$ as the estimate $BER_n$, and thereafter starts a BER test for an (n+1)-th time/voltage slice. The test control circuitry 340 may perform the BER test for a plurality of time/voltage slices as a part of a margining operation. The estimated $BER_i$ that are output by the test control circuitry 340 may be stored in a storage medium. For example, a margining matrix may be generated that includes cells that each corresponds to a potential time/voltage slice, and the estimated $BER_i$ may each be stored in the cell of its corresponding time/voltage slice. Note that not every possible combination of timing settings and voltage settings is necessarily tested during a margining operation, and therefore some cells of the margining matrix might remain empty.

Test control circuitry 340 may control operations that are performed by other components by sending signals or other messages to those components. For example, test control circuitry 340 may use the control signal Ctrl to signal to other components (both within system 300 and external to system 300) that the test operation is to be started or stopped, as well as to control other functions related to the performance of a BER test. In some cases the control signal Ctrl may be communicated directly to the other component, whereas in other cases the control signal may cause other messages to be communicated to the component. The control signal Ctrl may be referred to in the singular form occasionally for simplicity, but in practice the control signal Ctrl may be made up of multiple distinct control signals that each control different functions. For example, the control signal Ctrl may include a control signal $Ctrl_{test}$ that controls counting of the counters 122 and 123, and a control signal $Ctrl_{start}$ that controls resetting of the counters 122 and 123. At the start of a BER test, the test control circuitry 340 may use the control signal $Ctrl_{start}$ to reset counters 122 and 123 and may use the control signal Ctrl$_{test}$ to enable the counting of E$_i$ and N$_i$. At the end of the BER test, test control circuitry 340 may use the control signal Ctrl$_{test}$ to disable further counting of E$_i$ and N$_i$.

As noted above, test control circuitry 340 may cause a test signal SIG$_{TEST}$ to be sent to slicer 110 throughout the test operation. In certain examples, test control circuitry 340 may itself generate the test signal SIG$_{TEST}$ and communicate it to slicer 110. In other examples, some other component, which may or may not be part of system 300, may generate the test signal SIG$_{TEST}$, in which case test control circuitry 340 may control the second of the test signal SIG$_{TEST}$ by communicating to the other component that the test is to begin or end.

Figure 6:
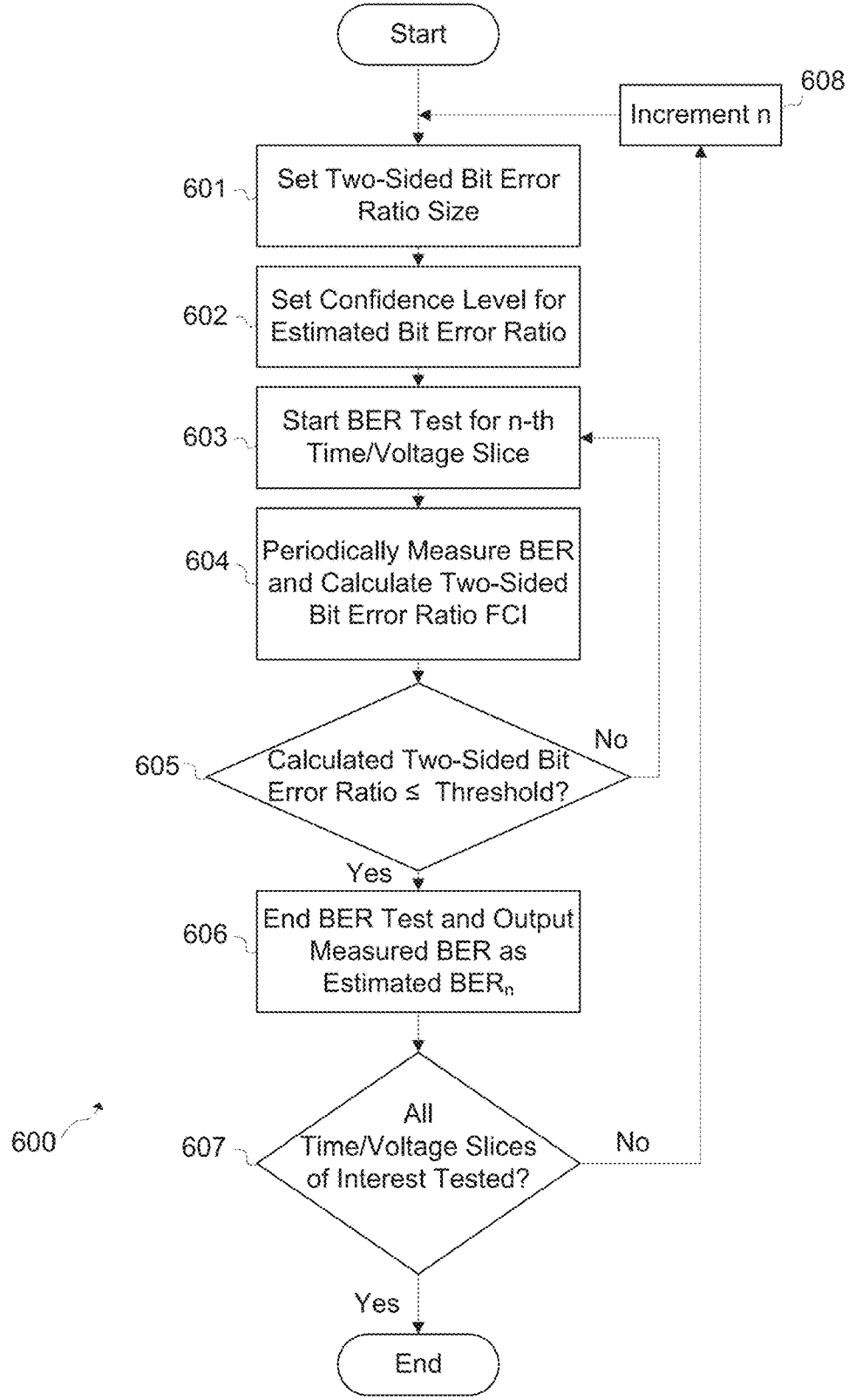
FIG. 6 illustrates an example method of controlling a margining operation.

FIG. 6 illustrates an example method 600 of controlling a margining operation. In block 601, a target size for a two-sided bit error ratio interval may be set. In an example implementation, the two-sided bit error ratio size may be a variable input, and may be programmable, (e.g. set by a user). In certain examples, the two-sided bit error ratio size may be set by using analytical or numeric solutions to specified mathematical formulas. In certain examples, the two-sided bit error ratio size may be set by referencing a lookup table for stored values of the two-sided bit error ratio size that have been calculated in advance. Such referencing of a lookup table may be accomplished by processing circuitry executing machine-readable instructions, or by dedicated hardware.

In block 602, a confidence level for a two-sided bit error ratio may be set. As described above, the two-sided bit error ratio size may be a variable input, and may be programmable, (e.g. set by a user). In certain examples, the two-sided confidence level may be set by using analytical or numeric solutions to specified mathematical formulas. In certain examples, the two-sided bit error ratio size may be set by referencing a lookup table for stored values of the confidence value that have been calculated in advance. Such referencing of a lookup table may be accomplished by processing circuitry executing machine-readable instructions, or by dedicated hardware.

In block 603, a BER test for an n-th time/voltage slice is begun. Beginning the BER test may include, for example, causing timing and voltage parameters of a slicer to be set based on the n-th time/voltage slice, causing a test signal to be sent to the slicer, and starting the detection of errors E and counting of a number of bits N. On a first iteration, n may be initialized to 1 prior to performing block 603.

In block 604, $\overline{BER}_n$ is periodically measured and the two-sided bit error ratio FCI is periodically calculated. Measuring $\overline{BER}_n$ may include dividing the number errors received thus far E$_n$ by the total bits received thus far N$_n$. Furthermore, the two-sided bit error ratio FCI may be calculated from the measured $\overline{BER}_n$ in conjunction with the set confidence level.

In block 605, it may be determined whether the calculated two-sided bit error ratio FCI is less than or equal to a threshold two-sided bit error ratio interval as determined from the two-sided bit error ratio target size interval set in block 601; if so, the process proceeds to block 606 and if not the process returns to block 603, where testing is once again begun and another number of bits N are measured. In an example implementation, the two-sided bit error ratio target size interval is the threshold two-sided bit error ratio interval. Because a two-sided bit error ratio FCI guarantees convergence, a greater the number of bits received N$_n$ ensures a smaller calculated two-sided bit error ratio FCI, provided the confidence level remains constant. Thus, the process may repeat until a calculated two-sided bit error ratio is determined to be less than or equal to the threshold two-sided bit error ratio.

Where it is determined that the calculated two-sided bit error ratio is less than or equal to the threshold two-sided bit error ratio, the BER test may be ended in block 606, followed by an output of the most recent value of the measured BER as the estimated BER$_n$ for the n-th time/voltage slice.

In block 607, it is determined whether all of the time/voltage slices of interest have been tested. If not, the process returns to block 601, with n being incremented at block 608. If all of the time/voltage slices of interest have been tested, then the process ends.

Figure 7:
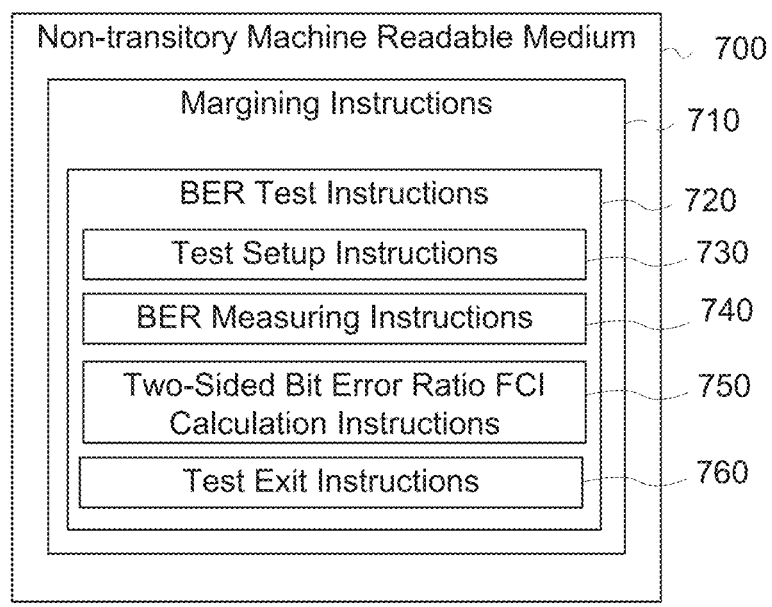
FIG. 7 is a block diagram illustrating an example non-transitory machine readable medium that stores margining instructions.

FIG. 7 illustrates an example non-transitory machine readable medium 600. Non-transitory machine readable medium 700 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.). The non-transitory machine readable medium 700 may include margining instructions 710 to perform a margining operation. The margining instructions 710 may be instructions that, when executed by processing circuitry, cause the processing circuitry to perform some or all of the operations described herein in relation to a margining operation.

For example, the margining instructions 710 may include BER test instructions 720 for performing a BER test for a time/voltage slice. The margining instructions 710 may further include instructions to execute the BER test instructions 720 for each of a plurality of time/voltage slices, thereby causing the BER test to be performed for the plurality of time/voltage slices.

The BER test instructions 720 may include instructions to perform a BER test. The BER test instructions 720 may be instructions that, when executed by processing circuitry, cause the processing circuitry to perform some or all of the operations described herein in relation to a BER test operation. For example, the BER test instructions 720 may include test setup instructions 730, BER measuring instructions 740, two-sided bit error ratio FCI calculation instructions 750, and test exit instructions 760. Test setup instructions 730 may include instructions to cause timing and voltage parameters of a slicer to be set based on a time/voltage slice that is being tested. In an example implementation, test setup instructions 730 may include instructions to set a target size for a two-sided bit error ratio interval and/or a confidence level for an estimated bit error ratio. In an example instance, test setup instructions 730 may prompt a user to set the target size for the two-sided bit error ratio interval and/or the confidence level for the estimated bit error ratio.

BER measuring instructions 740 may include instructions to detect errors E$_i$ and count the total number of bits N$_i$ and to periodically measure $$BER_i = \frac{E_i}{N_i}.$$

Two-sided bit error ratio FCI calculation instructions 750 may include instructions to periodically calculate the two-sided bit error ratio FCI for the set confidence level and the most recently measured $\overline{BER}_i$. The test exit instructions 760 may include instructions to apply exit criteria to determine when the test should be ended, where applying the exit criteria may include determining whether the calculated two-sided bit error ratio FCI is less than or equal to a threshold two-sided bit error ratio FCI, as determined from the set target size of the two-sided bit error ratio interval.

While the above disclosure has been shown and described with reference to the foregoing examples, it should be understood that other forms, details, and implementations may be made without departing from the spirit and scope of this disclosure.

The invention claimed is:

1. A method comprising:
setting a target size for a two-sided bit error ratio interval;
setting a confidence level for an estimated bit error ratio;
margining a receiver of a communications device by performing bit error ratio test operations corresponding to multiple time-voltage slices, each of the bit error ratio test operations comprising:
measuring a first number of total bits and a number of erroneous bits based on a digital output signal;
calculating a size of a two-sided bit error ratio frequentist confidence interval (FCI) from the measured number of total bits, the measured number of erroneous bits, and the set confidence level; and
outputting a measured bit error ratio where the calculated size of the two-sided bit error ratio FCI is less than the target size for the two-sided bit error ratio interval.

2. The method of claim 1, further comprising setting timing and voltage parameters of a slicer of the communications device based on the corresponding time-voltage slice.

3. The method of claim 1, further comprising designating the measured bit error ratio output as an expected bit error ratio for the corresponding time-voltage slice.

4. The method of claim 1, wherein the two-sided bit error ratio FCI is further calculated from a first bit error ratio determined by dividing the measured number of erroneous bits since a start of the test operation by of the measured number of total bits received since a start of the test operation.

5. The method of claim 4, further comprising extending the test operation in response to the calculated size of the two-sided bit error ratio interval being greater than the target size, the extension of the test operation resulting in a larger number of total bits received.

6. The method of claim 4, wherein the erroneous bits are detected by comparing each bit received to a trusted bit.

7. The method of claim 1, wherein the two-sided bit error ratio interval is calculated by fitting the measured bit error ratio to a binomial distribution.

8. A communications device comprising:
testing circuitry to determine an expected bit error ratio by performing a test operation, the test operation comprising:
periodically measuring a number of total bits and a number of erroneous bits based on a digital output signal;
calculating a size of a two-sided bit error ratio frequentist confidence interval (FCI) from the measured number of total bits, the measured number of erroneous bits, and a target confidence level; and
outputting a measured bit error ratio where the calculated size of the two-sided bit error ratio FCI is less than a two-sided bit error ratio FCI target size.

9. The communication device of claim 8, wherein the test operation further comprises designating a current value of the output bit error ratio as an expected bit error ratio.

10. The communication device of claim 8, wherein each of the test operations is ended upon outputting a respective measured bit error ratio.

11. The communication device of claim 8, further comprising a slicer to generate the digital output signal by thresholding a received signal according to variably set timing and voltage parameters.

12. The communication device of claim 11, wherein the testing circuitry determines an expected bit error ratio for multiple time-voltage slices by performing multiple test operations corresponding to multiple time-voltage slices.

13. The communication device of claim 8, further comprising:
a plurality of slicers, including the slicer, that are to generate respective digital output signals by thresholding the received signal according to respective timing and voltage parameters; and
a decoder circuit that outputs received bits by decoding the digital output signals of the plurality of slicers,
wherein each of the test operations further comprises setting the timing and voltage parameters of each of the plurality of slicers based on the corresponding time-voltage slice.

14. The communications device of claim 8, wherein the slicer and the testing circuitry are formed on the same integrated circuit.

15. A system comprising:
a communications device that includes a slicer that is to generate a digital output signal by thresholding a received signal according to variably set timing and voltage parameters; and
a testing device that includes testing circuitry that is to determine expected bit error ratios for multiple time-voltage slices by performing test operations corresponding respectively to the multiple time-voltage slices, each of the test operations comprising:
setting the timing and voltage parameters of the slicer based on the corresponding time-voltage slice,
periodically measuring a number of total bits and a number of erroneous bits based on the digital output signal;
calculating a size of a two-sided bit error ratio frequentist confidence interval (FCI) at a confidence level from the measured number of total bits and the number of erroneous bits; and
outputting the measured bit error ratio where the calculated size of the two-sided bit error ratio FCI is less than a two-sided bit error ratio interval target size.

16. The system of claim 15, wherein the testing circuitry comprises a processor connected to a non-transitory computer readable medium that stores program code that, when executed by the processor, causes the testing circuitry to perform the test operations.

17. The system of claim 15, wherein the testing circuitry comprises an application specific integrated circuit that performs the test operations.

18. The system of claim 15, wherein the communications device and testing device are formed on the same integrated circuit.

19. The system of claim 15, wherein the testing circuitry is configured such that the confidence level is a variable input.

20. The system of claim 15, wherein the testing circuitry is configured such that the two-sided bit error ratio FCI target size is a variable input.

\* \* \* \* \*